US009479645B2

(12) United States Patent
Moore et al.

(10) Patent No.: US 9,479,645 B2
(45) Date of Patent: *Oct. 25, 2016

(54) METHOD AND SYSTEM FOR CALL, FACSIMILE AND ELECTRONIC MESSAGE FORWARDING

(71) Applicant: AT&T Intellectual Property I, L.P., Atlanta, GA (US)

(72) Inventors: Darryl Cynthia Moore, Conyers, GA (US); Kathryn D. King, Decatur, GA (US); Sharon E. Carter, Austell, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 119 days.

This patent is subject to a terminal disclaimer.

(21) Appl. No.: 14/465,412

(22) Filed: Aug. 21, 2014

(65) Prior Publication Data

US 2014/0362980 A1    Dec. 11, 2014

Related U.S. Application Data

(63) Continuation of application No. 13/091,390, filed on Apr. 21, 2011, now Pat. No. 8,861,690, which is a
(Continued)

(51) Int. Cl.
*H04M 11/00* (2006.01)
*H04M 3/53* (2006.01)
(Continued)

(52) U.S. Cl.
CPC ....... *H04M 3/5307* (2013.01); *H04M 3/53333* (2013.01); *H04N 1/00209* (2013.01);
(Continued)

(58) Field of Classification Search
CPC .......................... H04M 3/5307; H04L 12/589
USPC ...................................... 379/88.13
See application file for complete search history.

(56) References Cited

U.S. PATENT DOCUMENTS 4,837,798 A * 6/1989 Cohen .................. G06Q 10/107
                                                              379/396
5,008,926 A    4/1991 Misholi
(Continued)

FOREIGN PATENT DOCUMENTS

EP        1051018        11/2000

OTHER PUBLICATIONS

U.S. Official Action dated Oct. 20, 2005 cited in U.S. Appl. No. 10/852,600.
(Continued)

*Primary Examiner* — Simon King
(74) *Attorney, Agent, or Firm* — Chiesa Shahinian & Giantomasi PC

(57) ABSTRACT

A method and system are provided for forwarding telephone calls, facsimile transmissions and electronic messages to a single forwarding telephone number. The telephone calls, fax transmissions and electronic messages are first forwarded to a central forwarding repository by the forwarding party where the fax transmissions, and messages are converted to audio formats. Forwarded telephone calls and audio formatted versions of the fax transmissions and electronic messages are then forwarded directly to a designated forwarding number. If the forwarding party answers at the forwarding number, she will receive forwarded calls, and the audio formatted versions of fax transmissions and electronic messages will be played to her over her telephone. If the forwarding party does not answer the forwarded call, she subsequently may retrieve saved telephone calls, saved telephone messages and saved audio versions of fax transmissions and electronic messages from the central forwarding repository.

17 Claims, 4 Drawing Sheets

Related U.S. Application Data continuation of application No. 12/291,791, filed on Nov. 13, 2008, now Pat. No. 7,953,212, which is a continuation of application No. 11/295,002, filed on Dec. 6, 2005, now Pat. No. 7,466,804, which is a continuation of application No. 10/022,941, filed on Dec. 17, 2001, now Pat. No. 7,046,772.

(51) Int. Cl.
*H04M 3/533* (2006.01)
*H04N 1/00* (2006.01)
*H04N 1/327* (2006.01)
*H04N 1/32* (2006.01)

(52) U.S. Cl.
CPC ...... *H04N1/00302* (2013.01); *H04N 1/32037* (2013.01); *H04N 1/32704* (2013.01); *H04N 1/32723* (2013.01); *H04N 1/32745* (2013.01); *H04N 1/32771* (2013.01); *H04M 2201/60* (2013.01); *H04M 2203/2016* (2013.01); *H04M 2203/4509* (2013.01); *H04M 2203/4536* (2013.01); *H04M 2207/12* (2013.01); *H04N 2201/0093* (2013.01)

(56) References Cited

U.S. PATENT DOCUMENTS

| | | |
|---|---|---|
| 5,479,411 A | 12/1995 | Klein |
| 5,479,491 A | 12/1995 | Garcia et al. |
| 5,524,137 A | 6/1996 | Rhee |
| 5,559,859 A | 9/1996 | Dai et al. |
| 5,742,905 A | 4/1998 | Pepe et al. |
| 5,761,312 A | 6/1998 | Zelikovitz et al. |
| 5,797,124 A | 8/1998 | Walsh et al. |
| 5,884,262 A | 3/1999 | Wise et al. |
| 5,892,814 A | 4/1999 | Brisebois et al. |
| 5,956,154 A | 9/1999 | Cairo |
| 5,963,626 A | 10/1999 | Nabkel |
| 6,049,796 A | 4/2000 | Siitonen et al. |
| 6,072,862 A * | 6/2000 | Srinivasan .......... H04L 12/5835 379/100.08 |
| 6,078,650 A | 6/2000 | Hansen |
| 6,091,947 A | 7/2000 | Sumner |
| 6,097,941 A | 8/2000 | Helferich |
| 6,122,348 A | 9/2000 | French-St. George et al. |
| 6,125,376 A | 9/2000 | Klarlund et al. |
| 6,181,780 B1 | 1/2001 | Finnigan |
| 6,181,781 B1 | 1/2001 | Porter et al. |
| 6,226,362 B1 | 5/2001 | Gerszberg et al. |
| 6,233,318 B1 | 5/2001 | Picard et al. |
| 6,285,984 B1 | 9/2001 | Speicher |
| 6,292,480 B1 | 9/2001 | May |
| 6,301,608 B1 | 10/2001 | Rochkind |
| 6,332,020 B1 | 12/2001 | Mitchell et al. |
| 6,368,205 B1 | 4/2002 | Frank |
| 6,374,223 B1 * | 4/2002 | Donaldson .............. H04L 12/66 704/260 |
| 6,446,114 B1 | 9/2002 | Bulfer et al. |
| 6,459,774 B1 | 10/2002 | Ball et al. |
| 6,487,277 B2 | 11/2002 | Beyda et al. |
| 6,487,278 B1 * | 11/2002 | Skladman ............... H04L 12/66 379/67.1 |
| 6,519,327 B1 | 2/2003 | Cannon et al. |
| 6,522,727 B1 | 2/2003 | Jones |
| 6,522,879 B2 | 2/2003 | Myer et al. |
| 6,529,602 B1 | 3/2003 | Walker et al. |
| 6,539,080 B1 | 3/2003 | Bruce et al. |
| 6,621,892 B1 | 9/2003 | Banister et al. |
| 6,633,630 B1 | 10/2003 | Owens et al. |
| 6,643,034 B1 | 11/2003 | Gordon et al. |
| 6,661,879 B1 | 12/2003 | Schwartz et al. |
| 6,683,940 B2 | 1/2004 | Contractor |
| 6,697,459 B2 | 2/2004 | Finnigan |
| 6,718,015 B1 | 4/2004 | Berstis |
| 6,721,397 B1 | 4/2004 | Lu |
| 6,728,934 B1 | 4/2004 | Scopes |
| 6,744,867 B1 | 6/2004 | Chin et al. |
| 6,792,093 B2 | 9/2004 | Barak et al. |
| 6,795,530 B1 | 9/2004 | Gilbert et al. |
| 6,801,763 B2 | 10/2004 | Elsey et al. |
| 6,829,334 B1 | 12/2004 | Zirngibl et al. |
| 6,850,609 B1 | 2/2005 | Schrage |
| 6,862,342 B1 * | 3/2005 | Hua .................. H04M 7/0009 379/88.13 |
| 6,888,930 B1 | 5/2005 | Hartselle et al. |
| 6,940,958 B2 | 9/2005 | Clapper |
| 6,987,841 B1 | 1/2006 | Byers et al. |
| 6,990,514 B1 | 1/2006 | Dodrill et al. |
| 7,046,772 B1 | 5/2006 | Moore et al. |
| 2001/0027097 A1 | 10/2001 | I'Anson |
| 2002/0031207 A1 | 3/2002 | Lin |
| 2002/0069060 A1 | 6/2002 | Cannavo et al. |
| 2002/0077082 A1 | 6/2002 | Cruickshank |
| 2002/0131566 A1 | 9/2002 | Stark et al. |
| 2002/0143885 A1 | 10/2002 | Ross, Jr. |
| 2002/0147592 A1 | 10/2002 | Wilmot et al. |
| 2002/0159572 A1 | 10/2002 | Fostick |
| 2002/0159573 A1 * | 10/2002 | Hitzeman ........... H04M 3/5307 379/88.17 |
| 2002/0183044 A1 | 12/2002 | Blackwell et al. |
| 2003/0012346 A1 | 1/2003 | Langhart et al. |
| 2003/0018720 A1 | 1/2003 | Chang et al. |
| 2003/0039342 A1 | 2/2003 | Yafuso |
| 2003/0078035 A1 | 4/2003 | Sheha et al. |
| 2003/0105707 A1 | 6/2003 | Audebert et al. |
| 2003/0119486 A1 | 6/2003 | Tari et al. |
| 2003/0135647 A1 | 7/2003 | Himmel et al. |
| 2003/0140090 A1 | 7/2003 | Rezvani et al. |
| 2003/0140091 A1 | 7/2003 | Himmel et al. |
| 2003/0142799 A1 | 7/2003 | Candell et al. |
| 2004/0010559 A1 * | 1/2004 | Han .................... G06Q 10/107 709/206 |

OTHER PUBLICATIONS

U.S. Official Action dated Jul. 14, 2006 cited in U.S. Appl. No. 10/109,975.
"Procedures for the Transfer of Facsimile Data Via Store-and-Foward on the Internet", T.37 (Jun. 1998).
"Full Mode", T/ 37 (1998) Amendment 1 (Sep. 1999).
Replacement of Reference RFC 2531 by RFC 2879; T.37 (1998) Amendment (Mar. 2001).
"Support of Image/Tiff and Image/Tiff-Fx MIME Content-Types," T.37 (1998) Amendment 3 (Nov. 2002).
U.S. Official Action dated Apr. 20, 2006 in U.S. Appl. No. 10/852,600.
U.S. Official Action dated May 4, 2005 issued in connection with U.S. Appl. No. 10/184,193.
U.S. Official Action dated May 18, 2005 issued in connection with U.S. Appl. No. 10/178,276.
U.S. Official Action dated May 3, 2005 issued in connection with U.S. Appl. No. 10/109,975.
U.S. Official Action dated Dec. 16, 2005 in U.S. Appl. No. 10/109,975.
U.S. Appl. No. 10/028,618, filed Dec. 20, 2001, entitled "Delivery of Wireless Messages to Wireline Interactive Devices", Inventors: Simpson.
U.S. Appl. No. 10/178,276, filed Jun. 24, 2002, entitled "Saving and Forwarding Customized Messages", Inventors: Roberts, et al.
U.S. Appl. No. 10/109,975, filed Mar. 29, 2002, entitled "Transferring Voice Mail Messages in Text Format", Inventors: Eason.
U.S. Appl. No. 10/112,663, filed Mar. 29, 2002, entitled "Saving Information from Information Retrieval Systems", Inventors: Hartselle, et al.
U.S. Office Action issued on Oct. 1, 2004 for U.S. Appl. No. 10/178,276.
U.S. Office Action issued on Aug. 25, 2004 for U.S. Appl. No. 10/109,975.

(56) References Cited

OTHER PUBLICATIONS

U.S. Appl. No. 10/180,149, filed Jun. 26, 2002, entitled "Categorization of Messages Saved on a Network-Based Based Vorcemail System", Inventors: Baker, et al.
U.S. Appl. No. 10/184,193, filed Jun. 27, 2002, entitled "Storage of Voicemail Messages at an Alternate Storage Location", Inventors: Baker, et al.
U.S. Official Action dated Jan. 11, 2006 for U.S. Appl. No. 10/180,167.
U.S. Official Action dated May 22, 2006 for U.S. Appl. No. 10/028,618.
U.S. Official Action dated Jul. 26, 2007 for U.S. Appl. No. 11/317,541.
U.S. Official Action dated May 1, 2006 for U.S. Appl. No. 10/184,193.
U.S. Official Action dated Aug. 25, 2005 for U.S. Appl. No. 10/178,276.
U.S. Official Action dated Oct. 4, 2005 for U.S. Appl. No. 10/028,618.
U.S. Official Action dated Nov. 4, 2005 for U.S. Appl. No. 10/184,193.
U.S. Official Action dated Jan. 14, 2005 in U.S. Appl. No. 10/180,261.
Office Action issued on Oct. 1, 2004 for U.S. Appl. No. 10/178,276.
Office Action issued on Aug. 25, 2004 for U.S. Appl. No. 10/109,975.
U.S. Appl. No. 10/180,149, filed Jun. 26, 2002, entitled "Categorization of Messages Saved on a Network-Based Voicemail System", Inventors: Baker, et al.
U.S. Appl. No. 10/180,167, filed Jun. 26, 2002, entitled "Voicemail Box with Caller-Specific Storage Folders", Inventors: Baker, et al.
U.S. Appl. No. 10/182,261, filed Jun. 26, 2002, entitled "Voicemail System with Subscriber Specific Storage Folders", Inventors: Baker, et al.

* cited by examiner

METHOD AND SYSTEM FOR CALL, FACSIMILE AND ELECTRONIC MESSAGE FORWARDING

CROSS REFERENCE TO RELATED APPLICATIONS

This application is a continuation of U.S. patent application Ser. No. 13/091,290, filed Apr. 21, 2011, which is a continuation of U.S. patent application Ser. No. 12/291,791, filed Nov. 13, 2008, now U.S. Pat. No. 7,953,212, which is a continuation of U.S. patent application Ser. No. 11/295,002, filed Dec. 6, 2005, now U.S. Pat. No. 7,466,804, which is a continuation of U.S. patent application Ser. No. 10/022,941, filed Dec. 17, 2001, now U.S. Pat. No. 7,046,772, all of which are incorporated herein by reference.

FIELD OF THE INVENTION

The invention relates to a system and method for forwarding telephone calls, facsimile transmissions, and electronic messages to a selected forwarding number and for allowing receipt and retrieval of telephone calls and messages, facsimile transmissions and electronic messages in an audio format.

BACKGROUND OF THE INVENTION

With the rapid growth of telecommunications in recent years, it is common for a person to receive a communication in many forms including voice, electronic messages, and facsimile. Indeed, at a business, school or home a person often receives telephone calls, electronic messages and facsimile transmissions from a variety of sources throughout a given day. These different forms of communication may be independent of each other, or they may be connected and complimentary of each other.

When a person leaves her home or office, she often wants to forward her calls to a designated number where she may be reached while she is away. Systems are known for forwarding telephone calls to a designated number. However, with respect to electronic messages, a person must typically log onto some type of distributed computing network, such as an Internet-based system, to check and retrieve electronic messages received while the person is away from her office or home. In the case of instant messaging to a wireless personal digital assistant, a person may know that they will be located in an area in which their personal digital assistant has no service. Accordingly, the person must wait until she returns to a service area to receive messages sent to her while she is in the out-of-service area.

With respect to facsimile transmissions received during the absence of the recipient, facsimile transmissions typically print at the recipient's home or office facsimile machine and await her return. The recipient may either forward the facsimile transmissions to a designated remote facsimile number, or the recipient may have someone re-fax the document to her at the designated remote number.

There is a need in the art for a method and system for forwarding telephone calls, facsimile transmissions and electronic messages to a single repository from which those calls, messages and transmissions may later be retrieved.

There is also a need in the art for a method and system for converting electronic mail and facsimile transmissions into an audio format that may be forwarded along with forwarded telephone voice calls to a single forwarding number for receipt by a called party.

It is with respect to these considerations and others that the present invention has been made.

SUMMARY OF THE INVENTION

In accordance with the present invention, the above and other problems are solved by a method and system for forwarding telephone calls, facsimile transmissions and electronic messages to a single forwarding telephone number. The calls, fax transmissions and electronic messages are first forwarded to a central repository by the forwarding party where the fax transmissions, and electronic messages are converted to audio formats. Forwarded telephone calls and audio formatted versions of the fax transmissions and electronic messages are then forwarded directly to a designated forwarding number. If the forwarding party answers at the forwarding number, she will receive forwarded calls, and audio formatted versions of fax transmissions and electronic messages will be played to her over her telephone. If the forwarding party does not answer forwarded calls, she subsequently may retrieve saved telephone calls and saved audio versions of fax transmissions and electronic messages from the central forwarding repository. The forwarding party may retrieve saved messages as a retrieving party from the central forwarding repository after entry of a personal identification number to authenticate the forwarding (retrieving) party's permission to retrieve saved calls and messages.

These and other features and advantages, which characterize the present invention, will be apparent from a reading of the following detailed description and a review of the associated drawings. It is to be understood that both the foregoing general description and the following detailed description are exemplary and explanatory only and are not restrictive of the invention, as claimed.

DETAILED DESCRIPTION OF THE PREFERRED EMBODIMENT

Figure 1:
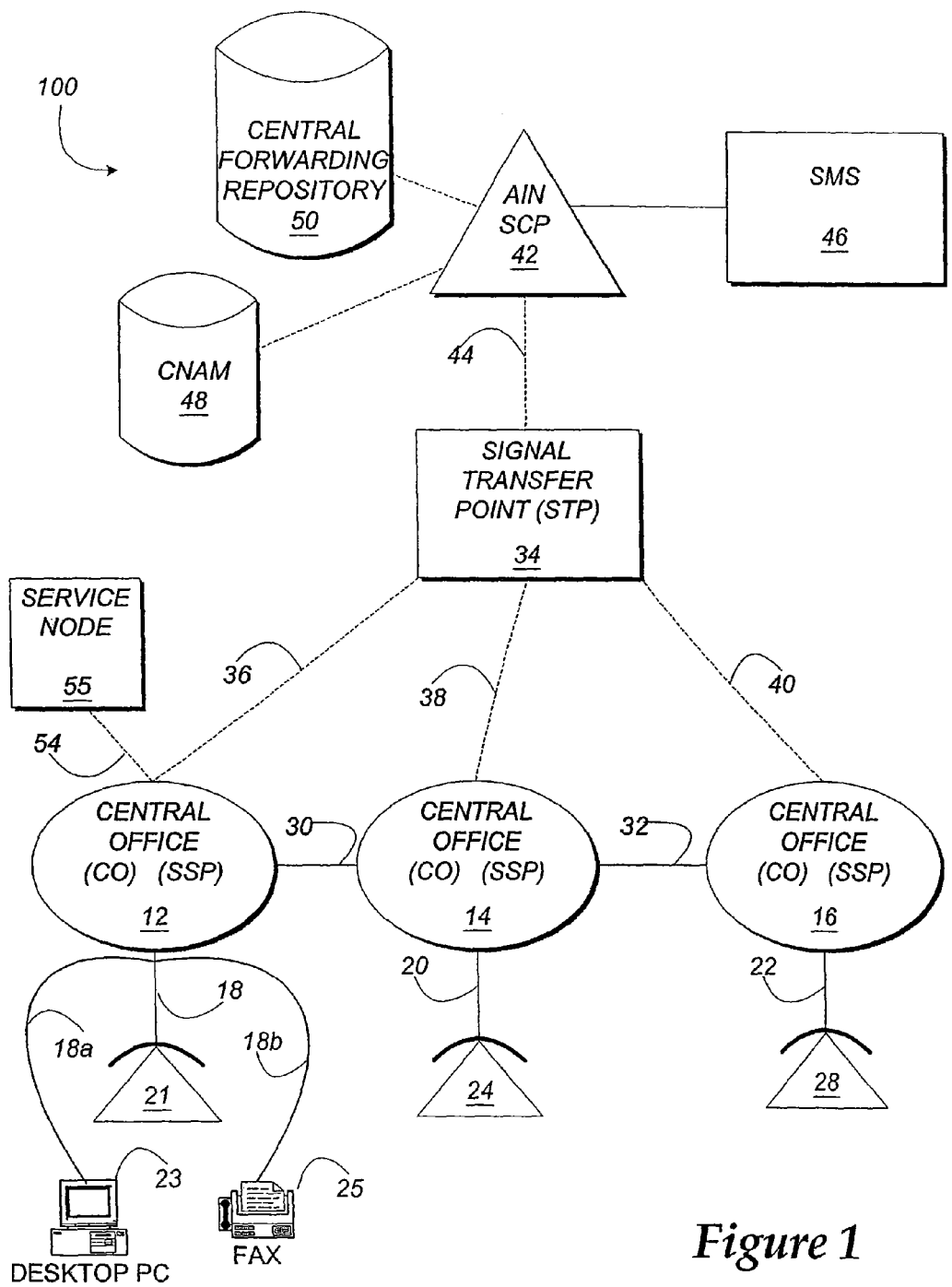
FIG. 1 is a block diagram illustrating components of a telephone network that provides an exemplary operating environment for the present invention.
Figure 2:
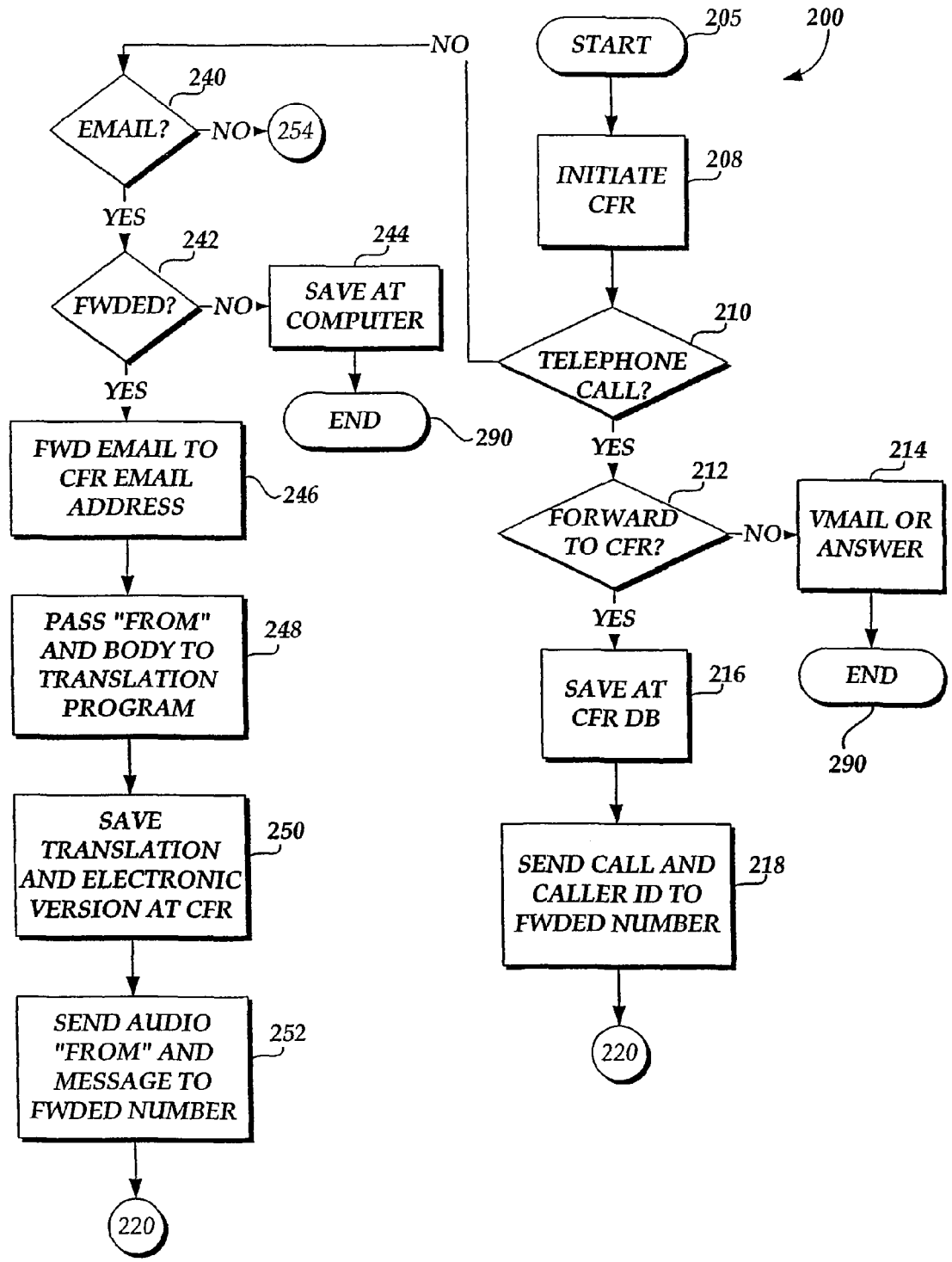
FIGS. 2-4 illustrate an operational flow of the steps performed by a system and method of the present invention for forwarding telephone calls, facsimile transmissions and electronic messages to a central repository or single forwarding number.
Figure 3:
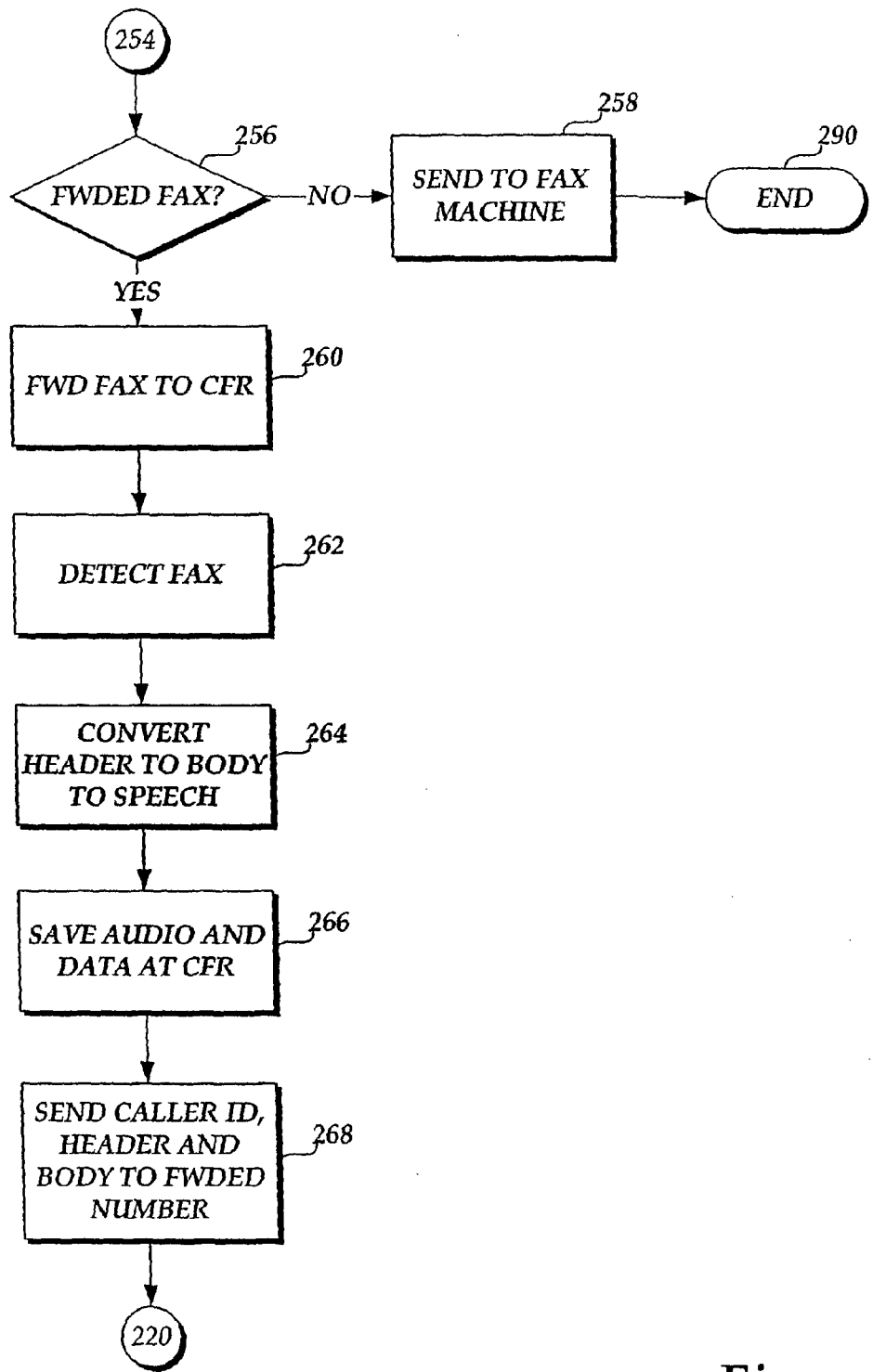
Figure 4:
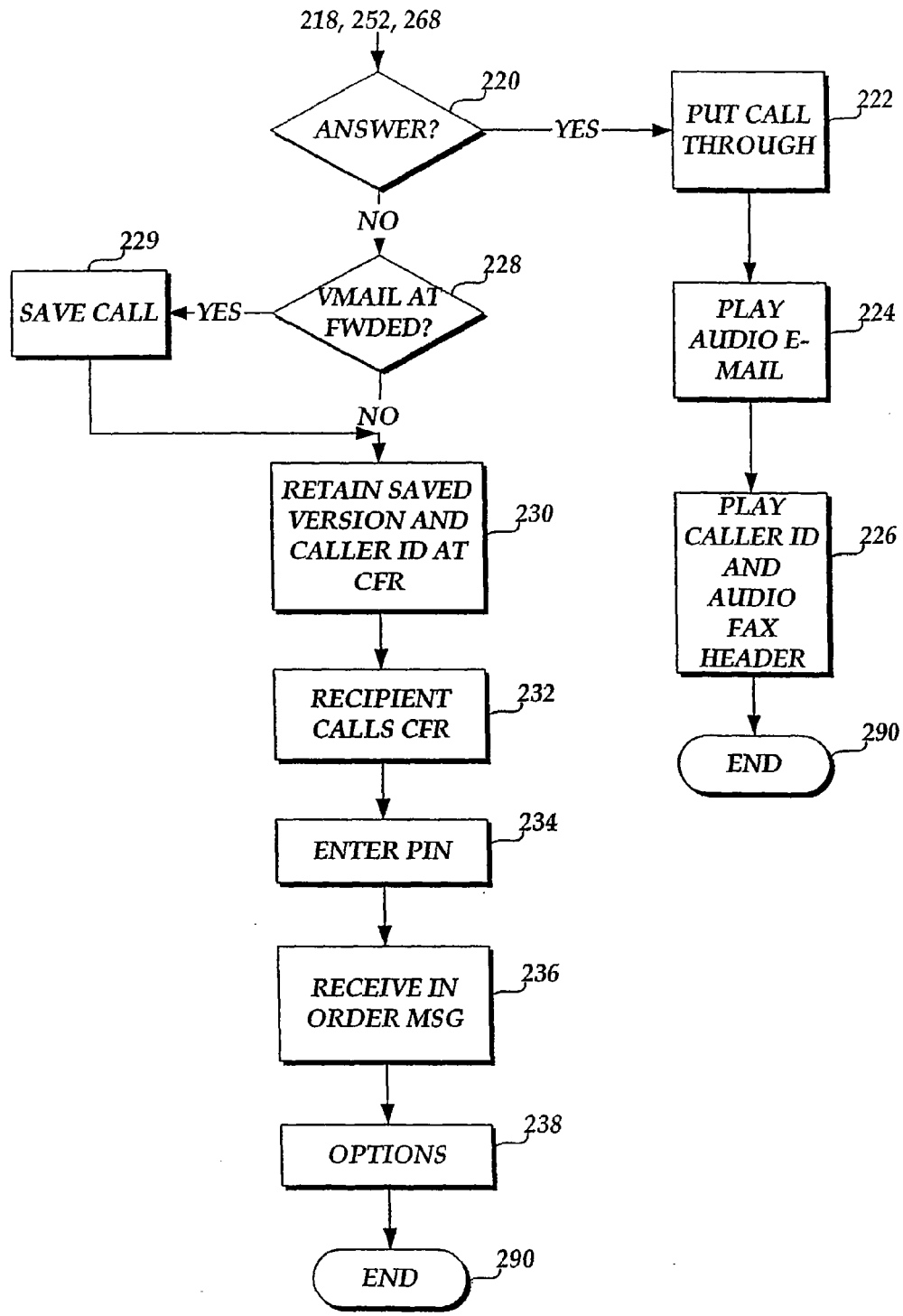

The following description of an exemplary embodiment of the present invention is made with reference to the above-described drawings wherein like numerals refer to like parts or components throughout the several figures. The present invention is directed toward a method and system for forwarding telephone calls, facsimile transmissions and electronic messages to a central repository from which those calls, transmissions, and messages may be retrieved in audio format. According to an alternative embodiment, electronic messages and facsimile transmissions may be converted from text to speech, and audio formatted versions of those messages and transmissions may be forwarded along with forwarded telephone calls directly to a designated forwarding number.

According to the present invention, prior to leaving a home, office or other location, a called party forwards all telephone calls, facsimile transmissions, and electronic messages to a single forwarding telephone number at which she may receive forwarded telephone calls and text-to-speech audio versions of facsimile transmissions and electronic messages. A telephone call directed to the called party is forwarded directly to the forwarding number according to conventional call forwarding methods. However, for the present invention, the forwarded telephone call is also saved in a central forwarding repository from which the called party may later retrieve voice mail if the called party does not answer the call at the forwarding number. Additionally, caller identification (caller ID) information is forwarded along with the forwarded telephone call to the forwarding number. If the called party does not receive the forwarded call and must retrieve the call from the central forwarding repository, caller identification information on the call is used to identify the saved call prior to retrieving the saved voice message.

Facsimile transmissions that are forwarded to the forwarding number are also saved in a central forwarding repository for subsequent retrieval by the called party. Prior to saving the facsimile transmission at the central forwarding repository, the header for the facsimile transmission identifying the source of the facsimile transmission is converted from text to speech, and the audio version of the facsimile transmission header is saved at the central forwarding repository. The audio version of the facsimile transmission header is then forwarded directly to the call forwarding number as directed by the called party. If the called party answers, she will hear the audio version of the facsimile header or transmission followed by a set of options for dealing with the facsimile transmission. For example, the called party may listen to the header only, or the called party may direct the facsimile transmission to be forwarded to a facsimile machine located nearby.

With respect to electronic messages, such as e-mail and wireless instant messaging, prior to leaving her home or office, the called party forwards electronic messages to the same forwarding number as she forwarded telephone calls and facsimile transmissions. When the called party receives an electronic message, the electronic message is forwarded to the central forwarding repository where the message header and text is converted from text to speech into an audio format. The audio formatted electronic message is saved in the central forwarding repository for subsequent retrieval by the called party, and then the audio version of the electronic message is forwarded directly to the forwarding number designated by the called party. If the called party answers the telephone at the forwarding number, the called party receives an audio version of the electronic message.

If the called party does not answer the telephone at the forwarding number, telephone calls, facsimile transmissions and electronic messages are saved in the central forwarding repository, and the called party may retrieve saved messages at any time by dialing into the central forwarding repository. In order to gain access to saved messages, the called party enters a personal identification number (PIN), and the called party is then given a number of options for listening to or processing saved audio versions of telephone calls, facsimile transmissions, and electronic messages saved at the central forwarding repository. For example, the called party may direct that a saved facsimile transmission be forwarded to a facsimile machine at the called party's forwarding location so that the called party may receive a printed version of the facsimile transmission.

For calls, transmissions or messages processed in accordance with the present invention, a call log is maintained at the central forwarding repository preferably including such information as date, time, length and identification, if available, of the call, transmission or message. The call log may be reviewed by the called party by dialing into the central forwarding repository and entering the PIN. Preferably, the call log includes information for all calls, transmissions or messages regardless of whether a message was left for the called party.

Exemplary Operating Environment

It is advantageous to describe an exemplary operating environment in which the current invention may reside. FIG. 1 is a block diagram illustrating components of a telephone network that provides an exemplary operating environment for the present invention. The public switched telephone network that evolved in the 1980s incorporated the advanced intelligent network (AIN). Some of the components of the advanced intelligent network are illustrated in FIG. 1. The advanced intelligent network (AIN) uses the signaling system 7 (SS7) network for signal or system control message transport. The components thereof are well-known to those skilled in the art. The operation of many of the components of the advanced intelligent network is also described in U.S. Pat. No. 5,245,719 to Weisser entitled "Mediation of Open Advanced Intelligent Network Interface by Shared Execution Environment" which is incorporated herein by reference. The SS7 communications protocol is provided in the document entitled "Bell Communications Research Specification of Signaling System 7," Document TR-NWT-000246, Issue 2 (June 1991), plus Revision 1 (December 1991), which is also incorporated herein by reference.

A plurality of central offices are provided in a typical public switched telephone network. As shown in FIG. 1, each central office may include an electronic switch known to those skilled in the art as a service switching point (SSP). These are indicated in FIG. 1 as SSP switches 12, 14 and 16. The terms "SSP" and "switch" are used interchangeably hereinafter and are understood to refer to a telecommunications switch having AIN capability and which may be utilized for connecting voice channel circuits, including voice channel lines, such as trunk circuits 30 and 32.

As shown in FIG. 1, central offices switches (SSP) 12, 14 and 16 have a plurality of subscriber lines 18, 18a, 18b and 20 connected thereto. Each of the subscriber lines 18 and 20 is connected to a terminating piece or pieces of customer premises equipment that are represented by telephones 21, 24 and 28. SSP switches 12, 14 and 16 are connected by a plurality of trunk circuits 30. These are the voice path trunks that interconnect the central offices 12, 14 and 16 and over which calls are connected when completed. A computer 23 and a facsimile machine 25 are shown as connected to the switch 12 via lines 18a and 18b.

Each piece of terminating equipment in the PSTN is preferably assigned a directory number. The term "directory number" is used herein in a manner consistent with its generally understood meaning of a number that is dialed or input by an originating party at an originating station to reach a terminating station associated with the directory number.

Much of the intelligence, and the basis for many of the enhanced features of the network, resides in the local AIN service control point (SCP) 42 that is connected to signal transfer point 34 via SS7 data link 44. As is known to those skilled in the art, AIN service control points, such as SCP 42, are physically implemented by relatively powerful fault tolerant computers. Among the functions performed by the service control points is maintenance of network databases used in providing enhanced services.

Additional devices for implementing advanced network functions within the AIN 10 are provided by regional STPs (not shown), regional SCPs (not shown), and a service management system (SMS) 46. The STP 34 is connected to the SSPs via connections 36, 38 and 40. Both the regional SCPs and the local SCP 42, which represent a plurality of local SCPs distributed throughout the AIN 10, are connected via respective data links to the SMS 46. The SMS 46 provides a centralized platform for remotely programming the various SCPs of the AIN 10 so that a coordinated information processing scheme may be implemented for the AIN 10. The SMS 46 is implemented by a large general purpose computer and interfaces to business offices of the local exchange carrier and interexchange carriers. SSPs download, on a non-real time basis, billing information to a billing system 50 that is needed in order to appropriately invoice subscribers for the services provided.

The SCP 42 is also connected to a caller name (CNAM) database 48. The CNAM database comprises a plurality of directory numbers along with associated names for the directory numbers. The CNAM database may be used to provide a look-up database to provide caller ID service. The CNAM database may be comprised of directory numbers from wireline customers as well as wireless customers of wireless network 150.

The modern Advanced Intelligent Network 100 also includes service nodes (SN) such as service node 55 shown in FIG. 1. Those skilled in the art are familiar with service nodes, which are physically implemented by the same types of computers that embody the SCP 42. In addition to the computing capability and data base maintenance features, service nodes 55 use ISDN lines and may include DTMF signal recognition devices, tone generation devices, text to speech (TTS) voice synthesis devices and other voice or data resources. As shown in FIG. 1, the connection is through the SSP. For example SCN 55 is connected to SCP 42 via ISDN links 54 to SSP 12, ISDN/SS7 protocol conversion in SSP 12, and SS7 links 36 and 44. It is understood that the service node 55 may also be connected to a service management system, but such connection is not shown in FIG. 1. While service nodes 55 are physically quite similar to the SCP 42, there are some important differences in the uses to which they are put.

The central forwarding repository 50 (CFR) is a hardware and software platform for receiving, storing and processing forwarded telephone calls, facsimile transmissions and electronic messages in accordance with the present invention. The CFR 50 includes a multi-purpose computer system capable of communication with other computer systems in a distributed computer system such as computer systems resident in other network components such as the SCP 42 and the SN 55. Indeed, according to one embodiment of the present invention, the functionality and memory storage capacity of the CFR 50 may be resident at another network component such as the SCP 42 or the SN 55.

For electronic message processing according to the present invention, the CFR 50 is equipped with a gateway for receiving forwarded electronic messages, including electronic mail and instant messaging. As is well known to those skilled in the art, the electronic messages may be forwarded to the CFR 50 via a wireline and wireless Internet-based or intranet-based system. In order to forward electronic mail from the called party's home or office computer system to the CFR 50, the called party forwards all incoming electronic mail to an electronic mail address of the CFR 50 along with instructions to forward electronic messages to a designated forwarding telephone directory number. As should be understood by those skilled in the art, the called party may forward messages receivable at her computer 23 or at a number of wireless personal digital assistant devices.

The CFR 50 includes software for converting electronic messages forwarded from the called party to an audio format for forwarding to the designated forwarding telephone directory number. According to an exemplary embodiment, the CFR 50 includes a message transfer system, such as an application program interface for converting the e-mail text to a digital audio file. Exemplary and well-known digital audio files include WAV files and MP3 files. Once forwarded electronic messages are converted to digital audio files, the audio versions of the electronic mail are forwarded directly to the designated forwarding number for receipt by the called (forwarding) party. If the called party answers at the forwarding number, the "From" portion of the electronic mail header is played first to identify the source of the electronic message followed by the audio version of the body of the electronic message. If the called party does not answer the forwarded telephone call, the audio version of the electronic message is saved at the CFR 50. Subsequently, the called party may call into the CFR 50, and after entering a personal identification number (PIN), the called party may retrieve the audio version of the electronic message.

The CFR 50 is also equipped for receiving forwarded facsimile transmissions. According to an exemplary embodiment, the CFR 50 includes a fax server that is a computer capable of sending and receiving facsimile transmissions to and from other computers in a network. A fax modem is included for receiving fax transmission and decoding those transmissions into image form. According to the present invention, a software program, such as an application program interface, is included for receiving image output from the fax modem and converting the image output to text format that may be converted to a digital audio file, as described for electronic messages. The digital audio version of the fax transmission may then be forwarded directly to the called party at the designated forwarding number, or the digital audio version may be saved at the CFR 50 for subsequent retrieval by the called party. Preferably, the header for a given facsimile transmission is converted to audio format, while the body of the facsimile transmission is maintained in data format. As should be understood, the header of the facsimile transmission may include an address and/or telephone and facsimile numbers of the source and intended recipient, date, number of pages, etc., while the body portion of the facsimile transmission may include the text or images being directed to the recipient. Accordingly, only the audio version of the header information is forwarded to the called party. Once the called party receives the audio version of the facsimile transmission header, the called party may be given the option of forwarding the facsimile transmission to a facsimile machine located near the called party.

The CFR 50 is also equipped for maintaining a call log for all calls, transmissions or messages processed in accordance with the present invention. The call log preferably includes such information as date, time, length and identification, if available, of the call, transmission or message. The call log may be reviewed by the called party by dialing into the central forwarding repository and entering a personal identification number (PIN). Preferably, the call log includes information for all calls, transmissions or messages regardless of whether a message was left for the called party.

Operation of an Exemplary Embodiment

Having described an exemplary environment of the present invention with reference to FIG. 1, FIGS. 2-4 illustrate an operational flow of the steps performed by a system and method of the present invention for forwarding telephone calls, facsimile transmissions and electronic messages to a central repository or single forwarding number. A method 200 is described with reference to FIGS. 1 and 2, and for purposes of the exemplary call flow, assume that a called party forwards all incoming telephone calls, facsimile transmissions and electronic messages to a designated forwarding number.

The method 200 begins at step 205 and proceeds to step 208 where the called party initiates the call forwarding services of the present invention. At step 208, the called party forwards all incoming telephone calls, facsimile transmissions and electronic messages, including e-mail to her computer 23 and messages to her personal digital assistant, through the central forwarding repository 50 to a designated forwarding telephone directory number. It should be understood that the called party may forward all telephone calls, facsimile transmissions or electronic messages according to the present invention, or the user may only forward one of the three types of communication or any combination thereof. According to one embodiment of the present invention, the called party may initiate the services of the present invention by dialing a number of the central forwarding repository 50 and following instructions. Exemplary instructions may include providing the central forwarding repository 50 with the forwarding number so that all calls forwarded to that number are processed through the central forwarding repository 50 in accordance with the present invention as opposed to conventional call forwarding. Facsimile transmissions are likewise forwarded to the designated forwarding number via the central forwarding repository 50.

For electronic messages, the called party forwards all incoming electronic messages to an electronic mail address of the central forwarding repository 50. Preferably, the called party, as a subscriber to the forwarding service of the present invention, is provided with an electronic dialog box for entry of forwarding instructions including the designated forwarding directory number. The forwarding information is then transmitted to the central forwarding repository 50 by the called party.

At step 210, a first communication is received by the called party, and a determination is made whether the first communication is a telephone call. If yes, the method proceeds to step 212 and a determination is made as to whether telephone calls have been forwarded to a designated forwarding number. If not, the method proceeds to step 214 and the telephone call is directed to the called party's local voice mail service, or the telephone call is answered by a person located near the called party's telephone. The method ends at step 290.

According to an exemplary embodiment, the determination of whether the telephone calls have been forwarded in accordance with the present invention includes a query from the calling party switch 12 to the SCP 42 to determine whether calls directed to the called party's telephone directory number have been designated for forwarding in accordance with the present invention. If at step 212 the called party has forwarded all telephone calls to the designated call forwarding number, the method proceeds to step 216 and the SCP 42 routes the telephone call to the CFR 50 for processing.

At step 216, the central forwarding repository 50 captures caller identification information from the CNAM 48, if it is available for the telephone call placed to the called party. At step 218, the caller identification information and the telephone call are then forwarded to the designated forwarding number, for example, at telephone 24 via switch 14. The central forwarding repository 50 maintains control of the call and caller identification information during the forwarding process. At step 220, a determination is made as to whether the called party answers the telephone call at the forwarding number. If yes, the method proceeds to step 222 and the telephone call is put through to the called party along with the caller identification information. The method then ends at step 290.

If at step 220 the called party does not answer the telephone call at the forwarding number, the method proceeds to step 228 and a determination is made as to whether the called party has a voice mail service at the designated forwarding number. If yes, the method proceeds to step 229 and the forwarded call is saved at the local voice mail system associated with the forwarding number. Whether the call is saved at a local voice mail service for the forwarding number or not, the method proceeds to step 230 and the voice mail message left to the called party along with the caller identification information of the calling party are saved at the CFR 50. That is, if the called party does not answer the forwarded call any voice mail message for the called party will be saved at the CFR 50 in addition to a local voice mail system at the forwarding number.

At step 232, the called party calls the CFR 50 to obtain forwarded messages. If the forwarding number is associated with a local voice mail system as may be available at a hotel, visitor's office, and the like, the called party may check messages left at the forwarding number at step 229. However, if no voice mail system is associated with the forwarding number the called party calls into the CFR 50 to retrieve saved forwarded calls and messages.

At step 234, a network component such as the service node 55 plays a series of options to the called party for retrieving saved calls and messages. Before the messages are retrieved, the service node 55 requests the called party to enter a personal identification number (PIN) for access to messages saved at the central forwarding repository 50. The service node 55 obtains the PIN number from the called party and compares the PIN number with a database of PIN numbers to validate the called party's access. If the called party's PIN number is verified, the method proceeds to step 236 and saved telephone calls are played to the called party in the order in which they were received. Preferably, caller identification information is played to the called party immediately in advance of the saved telephone call. If desired, the called party may review only the call log maintained at the CFR 50 to get a quick summary of calls, transmissions and messages received and/or saved. At step 238, a number of call forwarding and voice mail options may be provided to the called party. For example, the called party may play each saved message in the order in which it was received, the called party may skip undesirable messages, the called party may save messages, the called party may forward the saved messages to yet a different telephone directory number, or the called party may delete saved calls, messages and call log information. The method ends at step 290.

Returning back to step 210, if the incoming communication to the called party is not a telephone call, the method proceeds to step 240 and a determination is made as to whether the incoming communication is an electronic message. If yes, the method proceeds to step 242 and a determination is made as to whether electronic messages directed to the called party have been forwarded to the central forwarding repository. If not, the method proceeds to step 244 and the incoming electronic message is saved at the called party's computer or personal digital assistant. If the called party has forwarded incoming electronic messages to the designated forwarding number, the method proceeds to step 246, and the incoming electronic message is forwarded to the central forwarding repository at the electronic mail address for the CFR 50.

At step 248, the "From" address for the e-mail message and the body of the electronic message are sent to the translation application program interface at the CFR 50 for translation into a digital audio file. The "From" address and body of the text are translated into a digital audio file such as a WAV or MP3 file, as described above. At step 250, the digital audio files are saved at the CFR 50 for subsequent retrieval by the called party. At step 252, the audio versions of the "From" address and electronic message body are forwarded to the designated forwarding number just as an incoming telephone call is forwarded to the forwarding number, as described above. That is, the designated forwarding number is called, and if the called party answers, the digital audio version of the electronic message and header will be played to the called party. If the called party does not answer at the forwarding number, the audio files of the electronic message and header are saved at the CFR 50 for subsequent retrieval by the called party as described above for saved telephone calls.

Referring back to step 240, if a determination is made that the incoming communication to the called party is not a telephone call or electronic message, the method proceeds to step 254 for processing of forwarded facsimile transmissions. At step 256, a determination is made as to whether the facsimile transmissions have been forwarded by the called party. If no, the incoming facsimile transmission is sent to the called party's facsimile machine, and the method proceeds to step 290. If however, the incoming facsimile transmissions have been forwarded to the designated forwarding number in accordance with the present invention, the method proceeds to step 260, and the incoming facsimile transmission is forwarded to the central forwarding repository 50.

At step 262, the CFR 50 detects that the incoming transmission is a facsimile transmission, and at step 264, the incoming transmission is directed through a fax modem for conversion of the fax transmission header into a digital audio format that may be forwarded to the designated forwarding number. As described above, the data received by the fax modem of the CFR 50 is passed through an application program interface for translating the facsimile image into readable text that may be converted from text to speech into a digital audio file. As should be understood, the entire facsimile transmission may be converted to an audio file for presentation to the called party at the forwarding number. Preferably, however, the facsimile transmission header is converted to a digital audio file and the body of the facsimile transmission is left in image format for subsequent retrieval by the called party.

At step 266, the audio formatted header and the facsimile body data are saved at the CFR 50. At step 268, caller identification information for the source of the facsimile transmission and the audio formatted header are forwarded to the designated forwarding number. As described above for forwarded telephone calls and audio formatted electronic messages, the called party may answer the forwarded telephone call at which point the called party will receive the caller identification information for the facsimile transmission and the audio version of the facsimile header. If the entire facsimile transmission is translated to an audio file, then the entire facsimile transmission may be played to the called party at step 226. If the called party does not answer the forwarded call, the facsimile transmission is retained at the CFR 50 for subsequent retrieval by the called party. The called party preferably is provided a number of options for handling the saved facsimile transmission. In addition to hearing the audio version of the header or facsimile transmission, the called party preferably is given the option to forward the facsimile transmission to a facsimile machine located near the called party so that the called party may print the facsimile transmission for review.

As described, a method and system are provided for allowing a called party to forward telephone calls, facsimile transmissions and electronic messages to a designated call forwarding number. Advantageously, forwarded calls, transmissions and messages are retained at a central forwarding repository for subsequent retrieval by a called party if the called party does not answer calls forwarded to the designated forwarding number. It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

We claim:

1. A computer readable storage device storing computer program instructions for forwarding an electronic message, the computer program instructions, when executed on a processor, cause the processor to perform operations, comprising:
   in response to receiving an electronic message directed to a subscriber address:
      designating a forwarding address for the electronic message;
      routing, by the processor, the electronic message to a central forwarding repository;
      converting a portion of an electronic message to an audio formatted transmission;
      transmitting the audio formatted transmission to a service node for storage;
   in response to a request for the electronic message:
      retrieving the audio formatted transmission;
      authenticating the request for the electronic message; and
      routing the audio formatted transmission to the forwarding address.

2. The computer readable storage device of claim 1, the operations further comprising:
   receiving a forwarding telephone directory number designated by the service node.

3. The computer readable storage device of claim 1, the operations further comprising:
   routing the audio formatted communication to a second address.

4. The computer readable storage device of claim 1, the operations further comprising:
   receiving the electronic message.

5. The computer readable storage device of claim 1, wherein the authenticating the request is based on a personal identification number.

6. The computer readable storage device of claim 1, wherein the portion of the electronic message is a message header.

7. A system comprising:
   a processor; and
   a memory to store computer program instructions, the computer program instructions, when executed on the processor cause the processor to perform operations comprising:
      in response to receiving an electronic message directed to a subscriber address:

designating a forwarding address for the electronic message;
routing the electronic message to a central forwarding repository;
converting a portion of an electronic message to an audio formatted transmission; and
transmitting the audio formatted transmission to a service node for storage;
in response to a request for the electronic message:
retrieving the audio formatted transmission;
authenticating the request for the electronic message; and
routing the audio formatted communication to the forwarding address.

8. The system of claim 7, the operations further comprising:
receiving a forwarding telephone directory number from the service node.

9. The system of claim 7, the operations further comprising:
routing the audio formatted communication to a second address.

10. The system of claim 7, the operations further comprising:
receiving the electronic message.

11. The system of claim 7, wherein the portion of the electronic message is a message header.

12. The system of claim 7,
wherein the authenticating the request is based on a personal identification number.

13. A method for forwarding an electronic message, the method comprising:
in response to receiving, by a processor, an electronic message directed to a subscriber address:
designating, by the processor, a forwarding address for the electronic message;
routing, by the processor, the electronic message to a central forwarding repository;
converting, by the processor, a portion of the electronic message to an audio formatted transmission; and
transmitting, by the processor, the audio formatted transmission to a service node for storage;
in response to a request for the electronic message:
retrieving, by the processor, the audio formatted transmission;
authenticating, by the processor, the request for the electronic message; and
routing, by the processor, the audio formatted transmission to the forwarding address.

14. The method of claim 13, further comprising:
designating, by the processor, a forwarding telephone directory number for receiving the audio formatted transmission.

15. The method of claim 13, further comprising:
forwarding, by the processor, the audio formatted transmission to a second forwarding address.

16. The method of claim 13, wherein the request for the electronic message comprises a personal identification number.

17. The method of claim 16, wherein the authenticating the request for the electronic message is based on the personal identification number.

* * * * *